(12) United States Patent
Donner

(10) Patent No.: US 11,541,964 B2
(45) Date of Patent: Jan. 3, 2023

(54) MULTI-SPEED TRANSMISSION WITH TWO PLANETARY GEARS

(71) Applicant: Wilfried Donner, Bad Neuenahr—Ahrweiler (DE)

(72) Inventor: Wilfried Donner, Bad Neuenahr—Ahrweiler (DE)

( * ) Notice: Subject to any disclaimer, the term of this patent is extended or adjusted under 35 U.S.C. 154(b) by 0 days.

(21) Appl. No.: 17/040,882

(22) PCT Filed: Mar. 24, 2019

(86) PCT No.: PCT/DE2019/000079
§ 371 (c)(1),
(2) Date: Dec. 21, 2020

(87) PCT Pub. No.: WO2019/192634
PCT Pub. Date: Oct. 10, 2019

(65) Prior Publication Data
US 2021/0107595 A1    Apr. 15, 2021
US 2022/0281556 A2    Sep. 8, 2022

(30) Foreign Application Priority Data

Mar. 28, 2018  (DE) .................. 10 2018 010 274.3
Sep. 17, 2018  (DE) .................. 10 2018 007 326.3

(51) Int. Cl.
*B62M 11/16*    (2006.01)
*B62M 11/18*    (2006.01)
*F16H 3/66*    (2006.01)

(52) U.S. Cl.
CPC ............. *B62M 11/18* (2013.01); *B62M 11/16* (2013.01); *F16H 3/66* (2013.01);
(Continued)

(58) Field of Classification Search
CPC .......... B62M 11/18; B62M 11/16; F16H 3/66; F16H 2200/0065; F16H 2200/2007; F16H 2200/2051
See application file for complete search history.

(56) References Cited

U.S. PATENT DOCUMENTS 5,322,487 A    6/1994  Nagano
5,540,456 A *  7/1996  Meier-Burkamp .... B62M 11/14
                                              192/64
(Continued)

FOREIGN PATENT DOCUMENTS

CN    1278502 C    10/2006
CN    102483137 A    5/2012
(Continued)

OTHER PUBLICATIONS

Machine translation of EP 2028096 filed Jul. 15, 2021 (Year: 2021).*

*Primary Examiner* — Tisha D Lewis
(74) *Attorney, Agent, or Firm* — Browdy and Neimark., P.L.L.C.

(57) ABSTRACT

The invention relates to a multi-speed transmission on a central axis (6a), comprising a drive-side hollow shaft (4a) and an output-side hub sleeve (I) and two, at least two-stage, planetary gearboxes (EG, NSG), arranged coaxially therebetween or therein, each gearbox having sun gears, planetary gears which are connected to one another via associated frames, and ring gears, and each can be shifted into a direct drive and into a plurality of stepped conversion modes, wherein the first planetary gearbox (EG) is driven on its frame (8) and can be selectively shifted, by means of three clutches (20, 30, 40), into the direct drive or by axially fixing individual sun gears (9c,9d) into said transmission modes, and the second planetary gearbox (NSG) can be shifted by further clutches (50, 60, 70, 80, 90) by means of
(Continued)

an axial fixing of the sun gear (204) when the input drive and output drive are shifted between its ring gear (200) or frame (202) into a conversion mode at a low speed and into a conversion mode at high speed and directly into a gear. By means of an axially displaceable control slide, spring-loaded, radially extending coupling rings (e.g 91*a*, 91*b*) of a respective gear stage can be released, such that the control slide is guided in helical circular grooves (24 . . . 94) of a coaxial switching drum (6*b*) and in radial slots that are oriented parallel to the gear axis of a hollow axle (6*a*) enclosing them, respectively actuating the associated coupling rings.

14 Claims, 13 Drawing Sheets

(52) U.S. Cl.
CPC ............... *F16H 2200/0065* (2013.01); *F16H 2200/2007* (2013.01); *F16H 2200/2051* (2013.01)

(56) References Cited

U.S. PATENT DOCUMENTS

| | | | |
|---|---|---|---|
| 6,048,287 | A | 4/2000 | Rohloff |
| 6,904,064 | B2 | 6/2005 | Sobe et al. |
| 9,279,480 | B2 | 3/2016 | Antal et al. |
| 9,302,738 | B2 | 4/2016 | Lermen et al. |
| 2012/0071290 | A1 | 3/2012 | Byun |

FOREIGN PATENT DOCUMENTS

| | | | | | |
|---|---|---|---|---|---|
| CN | 203902777 | U | | 10/2014 | |
| DE | 1081334 | B | | 5/1960 | |
| DE | 19745419 | A1 | | 4/1998 | |
| DE | 19720794 | A1 | * | 11/1998 | ............ B62M 11/18 |
| DE | 102007004802 | A1 | | 7/2008 | |
| DE | 102010051727 | A1 | | 5/2012 | |
| DE | 102014101726 | A1 | | 8/2015 | |
| DE | 102018007326 | A1 | | 10/2019 | |
| EP | 0531608 | A2 | | 3/1993 | |
| EP | 0915800 | A1 | | 5/1999 | |
| EP | 1289827 | B1 | * | 5/2005 | ............ B62M 11/16 |
| EP | 2028096 | A1 | | 2/2009 | |
| EP | 3456620 | A1 | | 3/2019 | |
| WO | WO-2014072344 | A1 | * | 5/2014 | ............ B62M 11/16 |
| WO | 2015120829 | A2 | | 8/2015 | |
| WO | 2019192634 | A1 | | 10/2019 | |

* cited by examiner

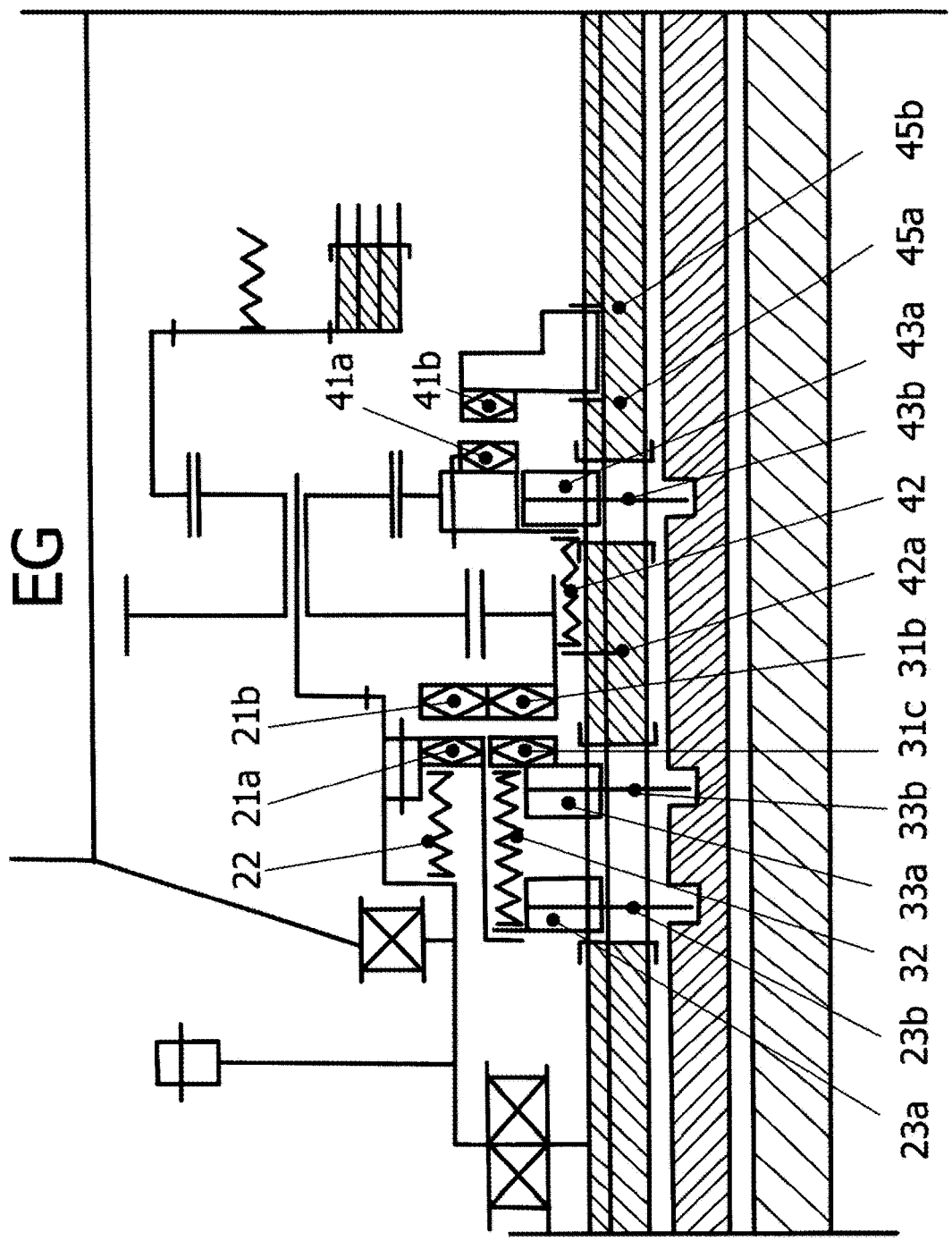

Fig. 3a

| Legend | |
|---|---|
| n | Condition |
| (i) | gear i shifted, but not yet engaged |
| O | clutch open |
| X | clutch closed |
| ‖ | clutch in freewheel |
| \|X\| | Clutch engaged, load-free (undefined) |
| ↓ | switching procedure |
| ↓ | switching under load |
| α | Specifies the angle at which the ratchet is to snap |
| ●—● | Shift kit changes gear |

Fig. 3b

Switching Sequence Table

| State n | Gear i | K20 | K30 | K40 | K50 | K60 | K70 | K80 | K90 | Angle α |
|---|---|---|---|---|---|---|---|---|---|---|
| 1 | 1 | X | O | O | X | O | X | X | O | 0° |
| 2 | (2) | ↓ | X | O | X | O | X | X | O | |
| 3 | 2 | O | X | O | X | O | X | X | O | 40° |
| 4 | (3) | O | ↓ | X | X | O | X | X | O | |
| 5 | 3 | O | O | X | X | O | X | X | O | 80° |
| 6 | (3) | ↓ | O | X | X | O | X | X | O | |
| 7 | (4) | X | O | O | X | O | [X] | ↓ | X | |
| 8 | 4 | X | O | O | X | O | O | O | X | 120° |
| 9 | (5) | ↓ | X | O | X | O | O | ↓ | X | |
| 10 | 5 | O | X | O | X | X | O | X | X | 160° |
| 11 | (6) | O | ↓ | X | O | X | O | X | [X] | |
| 12 | 6 | O | O | X | O | X | O | X | O | 200° |
| 13 | (6) | ↓ | O | X | O | X | O | X | [X] | |
| 14 | (7) | X | O | O | O | X | X | ↓ | X | |
| 15 | 7 | X | O | O | O | X | X | O | X | 240° |
| 16 | (8) | ↓ | X | O | O | X | X | O | X | |
| 17 | 8 | O | X | O | O | X | X | O | X | 280° |
| 18 | (9) | O | ↓ | X | O | X | X | O | X | |
| 19 | 9 | O | O | X | O | X | X | O | X | 320° |

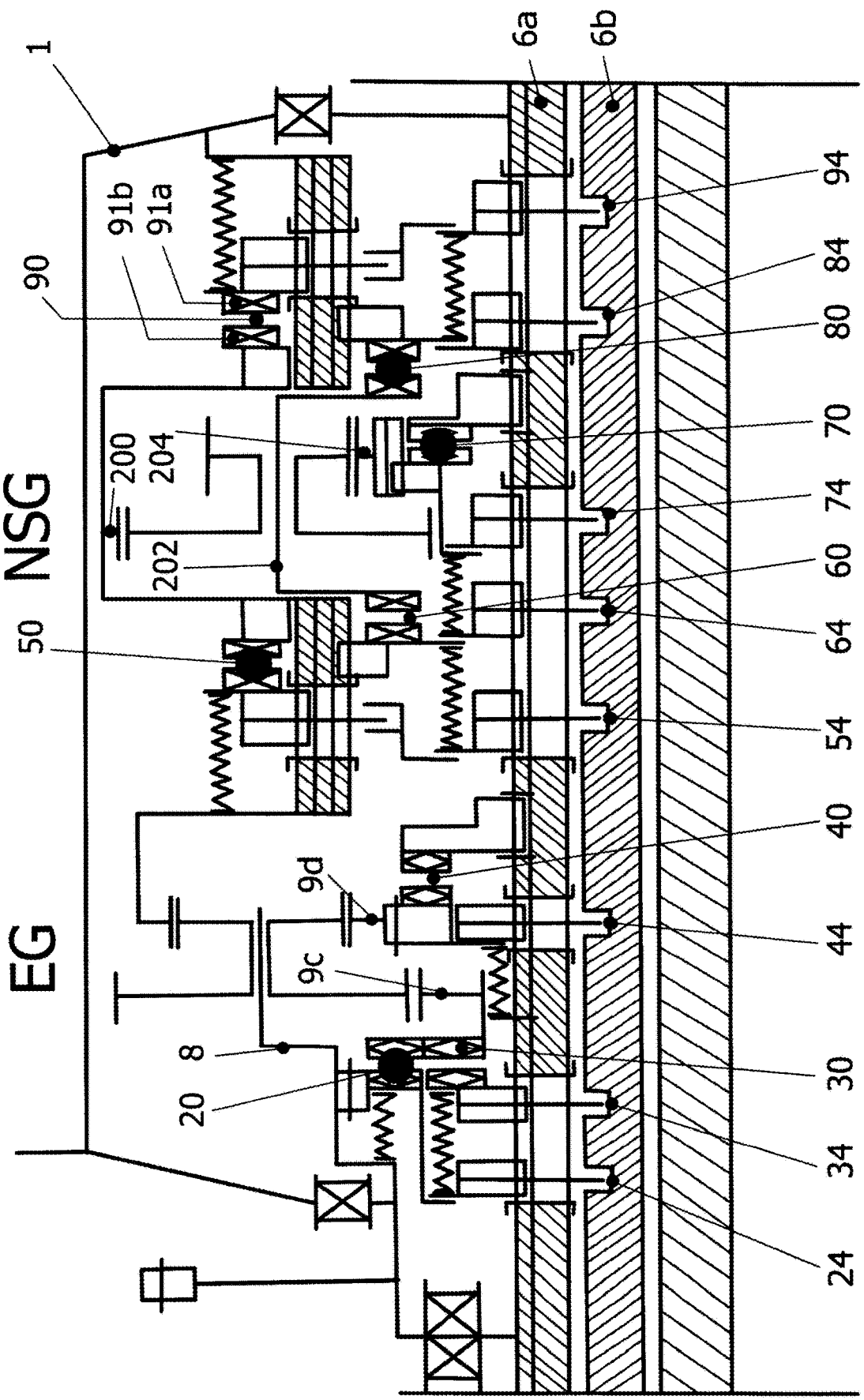

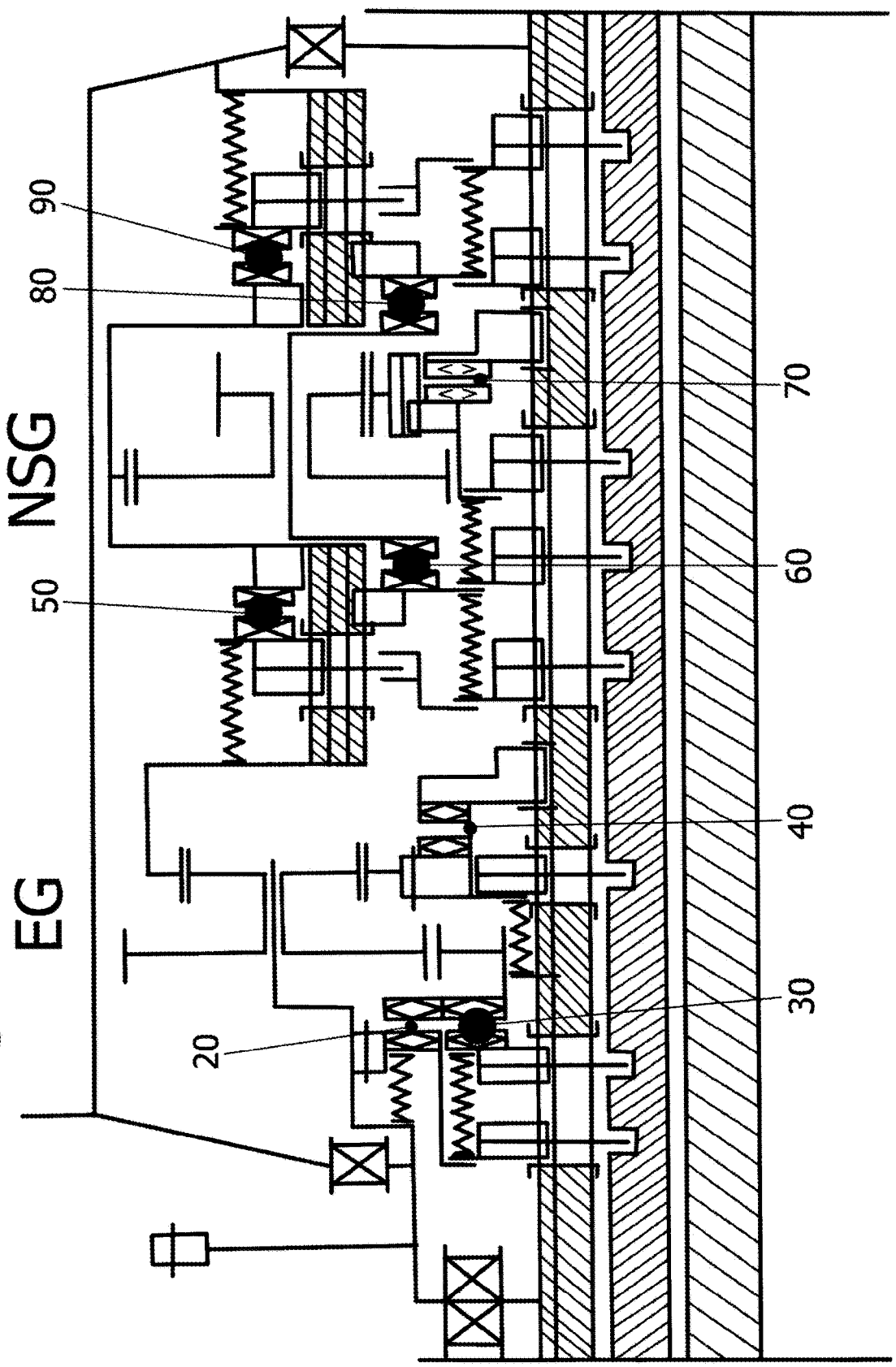

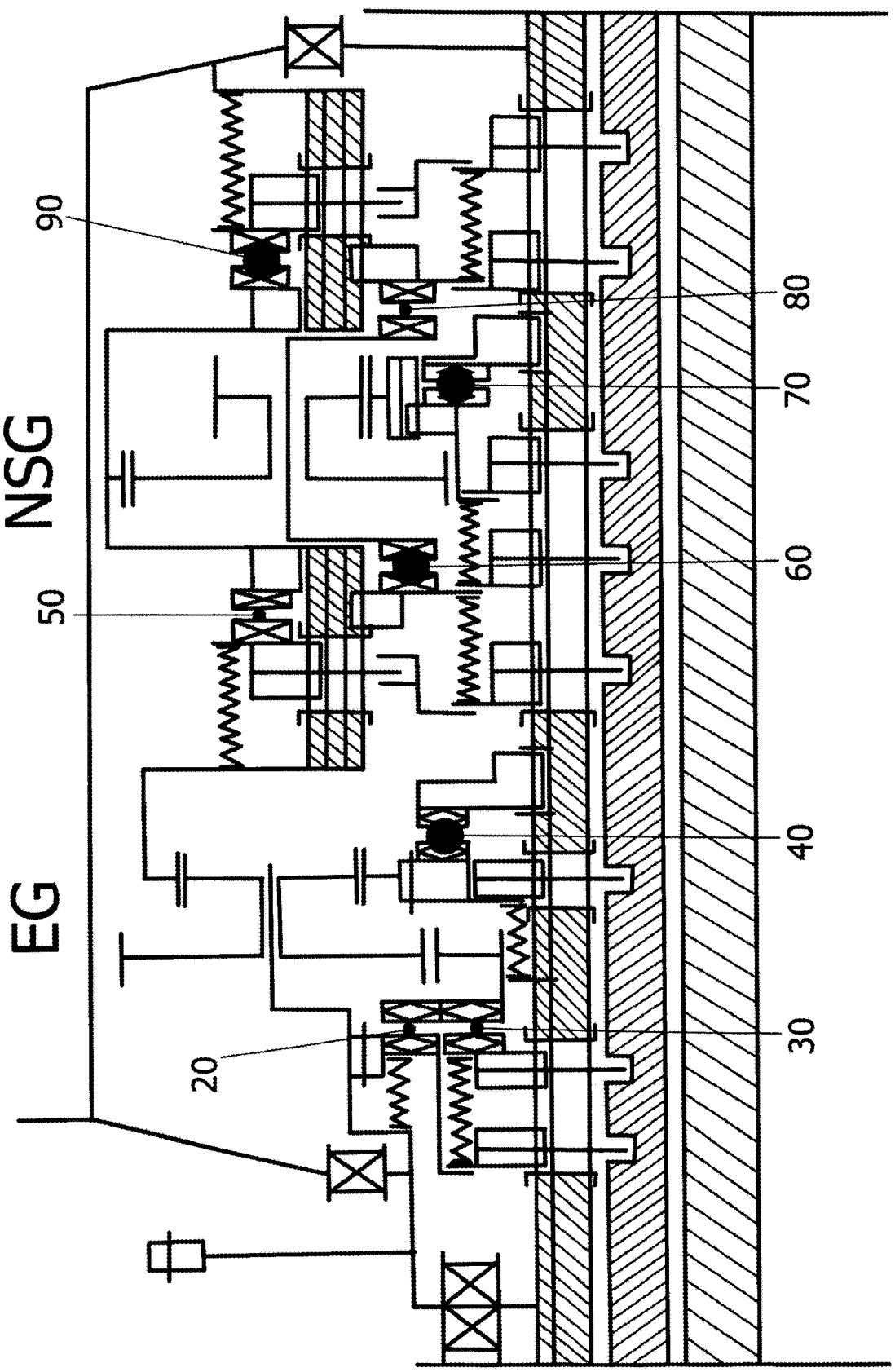

FIG. 12

| | |
|---|---|
| 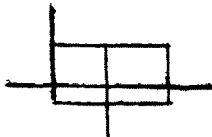 | Sliding ring with cylindrical pin and outer collar, axially movable, rotation on a shaft or axle blocked by internal gear teeth |
| 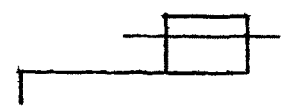 | Slide ring with inner collar, axially movable, rotation in a shaft or axle blocked by external toothing. |
| 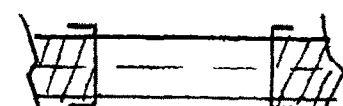 | Slotted hole in a hollow axle or hollow shaft to allow a cylindrical pin to pass through; represented by missing hatching and outward pointing square brackets. |
| 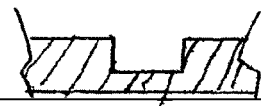 | Circumferential groove in the control shaft for guiding and axial movement of the cylindrical pins |
| 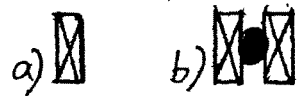 | Backstop or driving clutch, coupled in Direction of rotation of the drive a) open, b) closed |
|  | Travel stop, double against the direction of rotation of the drive<br><br>a) open, b) closed |
| 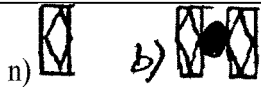 | Rolling bearing single, double |
|  | Locks, axially displaceable with cylindrical pin, rotationally fixed by internal toothing |
| 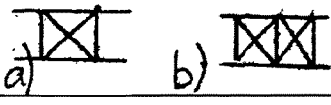 | Locks, axially fixed by circlips, rotationally fixed by internal gear |
| 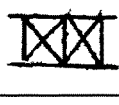 | detachable connection of two components |
| 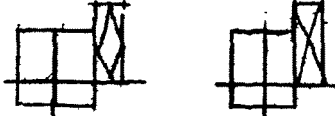 | bidirectionally acting clutch; a) unswitched, b) switched |

MULTI-SPEED TRANSMISSION WITH TWO PLANETARY GEARS

FIELD

In accordance with the generic term of the main claim, the invention relates to a multi-speed transmission, in particular for a two-wheeler, which is mounted on a central axle, has a hollow shaft on the input side and a hub sleeve on the output side, between which two at least two-stage planetary gears are inserted, which are each connected to one another by sun gears and associated webs, and each of which can be shifted with a ring gear either into a block revolution or one of several transmission or reduction modes.

BACKGROUND

A similar multi-speed transmission is known from EP 0915 800 B1. This comprises an axle which can be mounted non-rotatably on a bicycle frame, a driver rotatably mounted on the axle, a sleeve rotatably mounted on the axle, a gear shift mechanism provided with a first and a second planetary gearbox arranged in the sleeve and coupled to the driver and the sleeve to provide multiple gear ratios between the driver and the sleeve, the planetary gearboxes comprising at least two sun gears coaxial with the axle, have at least one planet carrier with correspondingly stepped planet gears engaging with the two sun gears and at least one ring gear engaging with the planet gears as well as a shifting device for selecting the transmission ratios by selectively connecting the sun gears to the axle, for which purpose the shifting device has means for selectively connecting the ring gear or the planet carrier of the first and/or second planetary gearbox to a sun gear of the same planetary gearbox. This preferably results in a 7×2=14-speed gearbox, in which a seven-speed gearbox, consisting of a direct gear and two two-stage manual gearboxes, is coupled in series with another gearbox, which has a direct gear and a shiftable planetary arrangement. The gears are shifted with 4 pawls, 3 axial clutches and 6 planetary sets, which are arranged to form three two-stage planetary arrangements. The disadvantage of this arrangement is the low input torque, which results in a preferred chain or belt gear ratio of preferably 2.5. The sun gears are axially fixed with pawls, which requires an internal gearing of the same, which is loaded asymmetrically by the pawls— for space reasons only one per sun gear—and only on one internal tooth. A further disadvantage is that no thru axle can be used.

A further multi-speed transmission is known from EP 2 028 096 A1, in which only 5 planetary sets, formed by a double and a triple stepped planet, but 12 clutches are provided.

The disadvantage of this arrangement is that six of the clutches are pawls which serve to fix the axes of the 4 sun gears. Other clutches, which act axially, have approximately ring gear diameters. In addition, the ring gears must be supported on their large diameters. The shifting mechanism of the transmission is very complex and costly to manufacture. In addition, the stepped planets cannot be supported by roller bearings, since some planets have a small number of teeth (14 or 15 teeth). A 12 mm thru axle is also not realizable. The input gear, consisting of two sun gears, two hollow gears and three triple stepped planets, provides three fast gear ratios in addition to the direct gear. The first gear of this transmission is the direct gear, which is formed by the coupling of planet carrier and ring gear. In the second and third gear, the transmission forms two sub-transmissions, but these are different for each of the two gears. The fourth gear is a simple planetary gearbox driven by the planet carrier with a double-step planet. The overall design results in a high number of different complex parts and a total mass that is significantly higher than the mass of the gearbox known from EP 0 915 800 B1.

Furthermore, multi-speed hub gears with three or four planetary sets are known from U.S. Pat. No. 9,279,480 B2, which can be coupled in various ways by nine clutches.

The clutches are actuated by a camshaft which actuates radial shifting means.

The disadvantages here are the low input torque that can be tolerated and the large number of different, complex production parts.

In the state of the art, transmissions of this type are shifted with pawls, which are supported in apertures in a transmission axle, controlled by cams on a shift shaft, and folded out or in (cf. EP 2028 096 A1; DE 10 2010 051.727 A1). If a gear wheel is to be fixed to the axle, the pawl folds out and engages in an internal toothing of the gear wheel to be fixed. On the one hand, the internal gearing has a notch effect, and on the other hand, the gear wheel is subjected to punctual internal loading. The wall of the hollow axle must be relatively thick-walled due to the high forces and thus have a relatively large diameter. It is known that pawls are difficult to collapse under load. A further switching type is shown in the U.S. Pat. No. 9,279,480 B2, where radial cams actuate the switching means.

Common to all these well-known hubs is that the drive pinion mounted on a hollow shaft has about half—or considerably less—the number of teeth than a pedal crank output blade usually has, because the input forces that can be tolerated are relatively low.

The toothed belts that are now widely used as a means of transmitting power to the rear wheel require a significantly larger number of teeth on the rear wheel because of their rigidity. The e-bikes that have been on the market for several years now enable higher average speeds, which in turn require a high transmission ratio bandwidth. Meanwhile, the 5 mm quick-release axle, which is used to clamp a hub in the rear triangle or fork, is increasingly being replaced by thru axles. In the rear wheel a diameter of 12 mm is common. The thru axle is mostly a long screw with a short 12 mm thread. The thru axle is inserted from one side through a suitable hole, passed through the hollow hub axle and then screwed into the thread of the opposite drop out. When tightening, the connection is preloaded.

SUMMARY

The invention is based on the task of designing the multi-speed transmission in such a way that a wide range of transmission ratios can be achieved with low weight, high efficiency, simple manufacture, a transmission ratio suitable for toothed belts and under load, with simple control, particularly good shifting and can be mounted in the dropouts of the rear end by means of a thru axle.

The solution is indicated in the identification of the main claim. Advantageous designs are indicated in the sub and secondary claims.

BRIEF DESCRIPTION OF THE FIGURES

FIGS. 1A and 1B illustrate a first gearbox of the transmission;

FIGS. 3A and 3B illustrate a switching sequence table with associated legend;

FIG. 4 illustrates the total transmission including the first and second gearboxes in first gear;

FIG. 5 illustrates the total transmission including the first and second gearboxes in 5th gear;

FIG. 6 illustrates the total transmission including the first and second gearboxes in 9th gear;

FIG. 12 illustrates the meaning of the symbols used in FIGS. 1b, 2b, 4, 5, and 6.

DETAILED DESCRIPTION

A preferred design is a nine-gear transmission with constant gear steps of approx. 24% at a transmission ratio range of approx. 560%. The input transmission ratio is selected in such a way that with the secondary transmission ratio of the chain or belt drive with e.g. 40 teeth at the front and a rider with e.g. approx. 36 teeth at the transmission huh, a total transmission ratio i_ges for the first gear of approx. i_ges.=1.7 results. For the ninth gear this results in a transmission ratio of 0.30.

This is achieved by coupling two three-speed planetary gears.

Figure 1A:
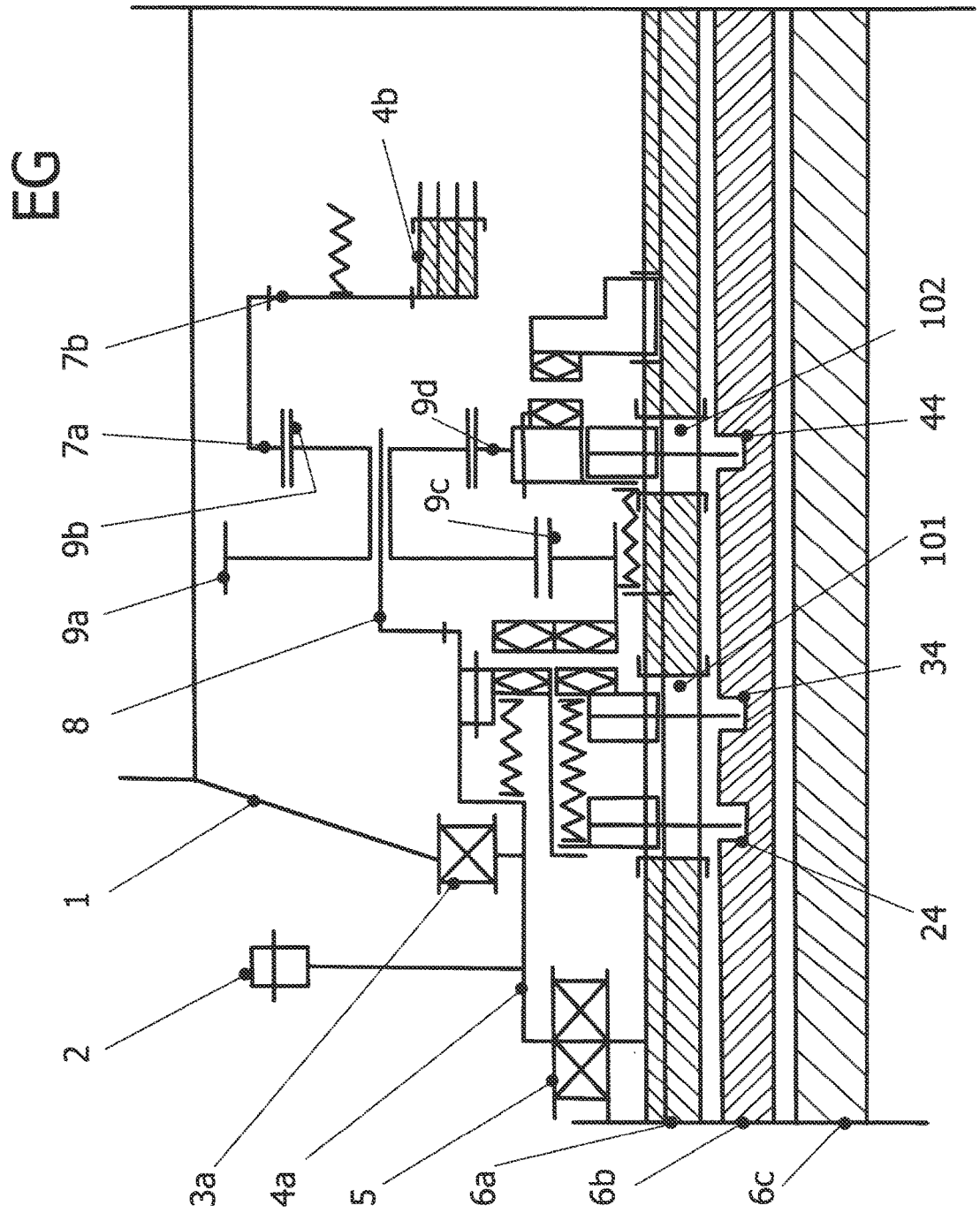

A first transmission gear box is illustrated in FIG. 1a, which consists of a web or bridge 8 with double stepped planets 9a and 9b, a ring gear 7a with side wall 7b and two sun gears 9c and 9d, which mesh with the corresponding planets 9a and 9b, respectively. The bridge 8 is driven by a driver 4a, on which the pinion 2 is fixed rotationally. The output of the first gear is via the ring gear 7a. If the transmission is operated in block rotation, the direct gear with 0.1=1 is Obtained, and the gear ratio with i_2=1/1.24=0.8065 is obtained if the smaller of the two sun gears is fixed to the axis. The gear ratio with i_3=1/1.5376=0.65 is obtained when the larger of the two sun gears is fixed to the axis. Thus, the transmission ratio is fast.

A first preferred design of a second gear consists of two identical planetary gearboxes, mirrored to each other, each consisting of a ring gear, a sun gear and double stepped planets, which are coupled by means of bridges that are connected to each other in a rotationally fixed manner (not shown). The first subgear of this add-on set is a reduction gear with approx. i_4=1.24^3=1.91 and the second subgear is a transmission gear with i_6−1/i_4=0.5245. The direct gear with i_5=1 is achieved when both subgears rotate as a block.

Figure 2A:
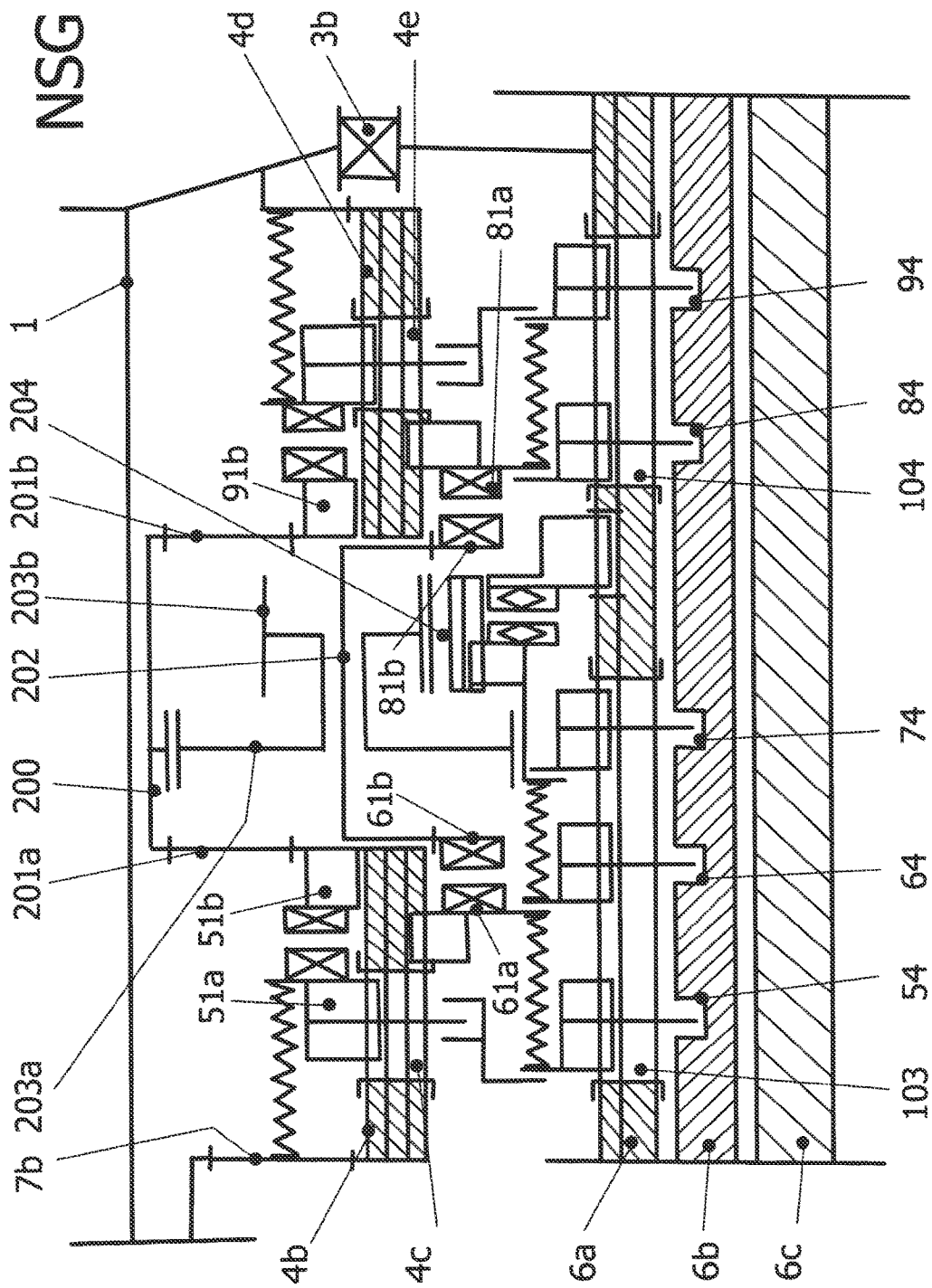
FIGS. 2A and 2B illustrate a second gearbox of the transmission.

A second preferred version of a second transmission according to FIG. 2a consists of a planetary gearbox identical to a partial gearbox of the first preferred version. The three gears of the first preferred design are realized by switching the gear input between ring gear and web. The same procedure is used for the abrasion. This does not change the gear ratios.

The following table shows that in the case of gears G1, G5, G6, G7, only one planetary gear set is involved in the power transmission and in the case of gears G2, G3, G8 and G9 only two are involved. This stands for a good efficiency of the gear hub. Gear G4 does not require any rolling motion of the gears.

| | Transmission EG | | | Transmission NSG | | | |
|---|---|---|---|---|---|---|---|
| Gear | i_1 | i_2 | i_3 | i_4 | i_5 | i_6 | i_Gn |
| 1 | 1 | | | 1.91 | | | i.si |
| 2 | | 0.81 | | 1.91 | | | 1.55 |
| 3 | | | 0.65 | 1.91 | | | 1.24 |
| 4 | 1 | | | | 1 | | 1 |
| 5 | | 0.81 | | | 1 | | 0.81 |
| 6 | | | 0.65 | | 1 | | 0.65 |
| 7 | 1 | | | | | 0.5245 | 0.53 |
| 8 | | 0.81 | | | | 0.5245 | 0.43 |
| 9 | | | 0.65 | | | 0.5245 | 0.34 |

According to the invention, the multi-speed transmission is shifted with axial clutches. A clutch is formed by two opposing discs, which can be operated by means of intermediate elements, with axially acting ratchet teeth acting in one direction, mounted on a circular ring perpendicular to the axis of rotation. In the following, a coupling that triggers the block rotation, "block lock", which prevents the sun gear from rotating when driven by the web, "tracking lock" and which prevents the sun gear from rotating backwards when driven by the ring gear, "backstop". In this case, the same direction of rotation as the driving belt or sprocket wheel is meant. If torque is to be transmitted with the same direction of rotation, the term "driver" is used.

Figure 2B:
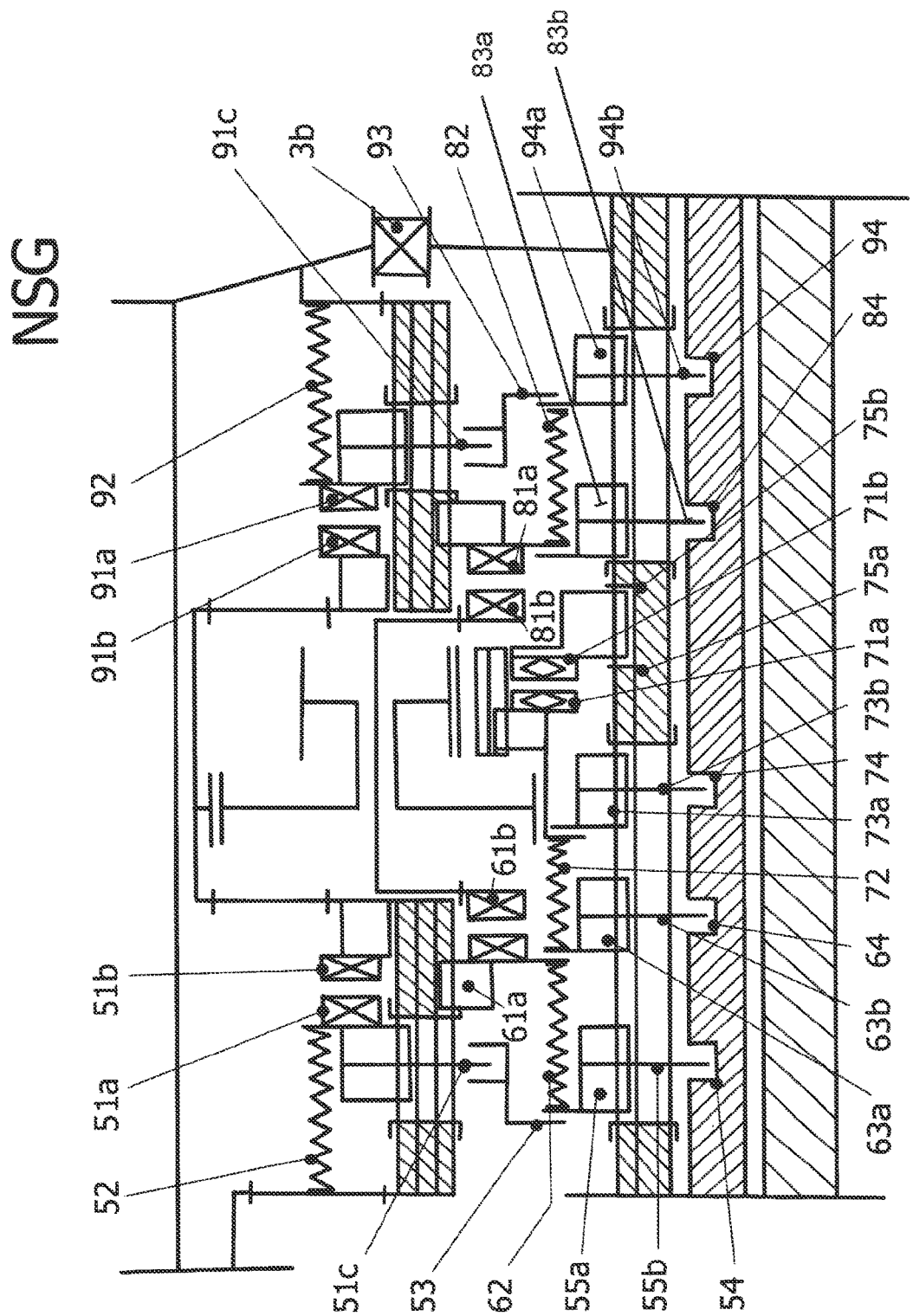

In the table shown in the symbols used in the figures are listed with their meaning. In FIGS. 1b and 2b, the reference symbols of the couplings are counted through in steps of ten and those of the associated parts or elements in steps of one. In FIGS. 4, 5 and 6, which describe the shifting states of the gears G1, G5, G9, only the clutch numbers are then mentioned.

Figure 7:
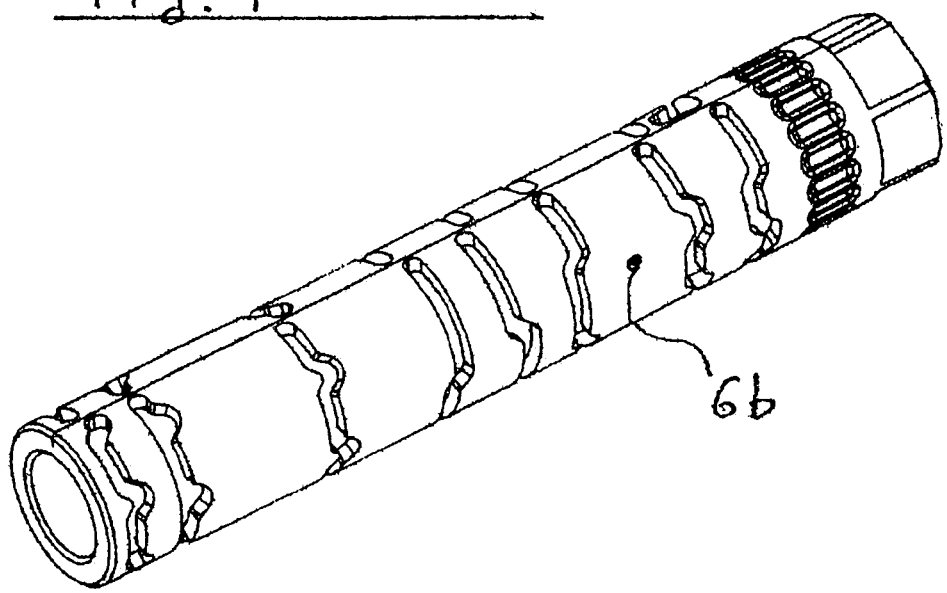
FIG. 7 illustrates a perspective view of the drum.
Figure 8:
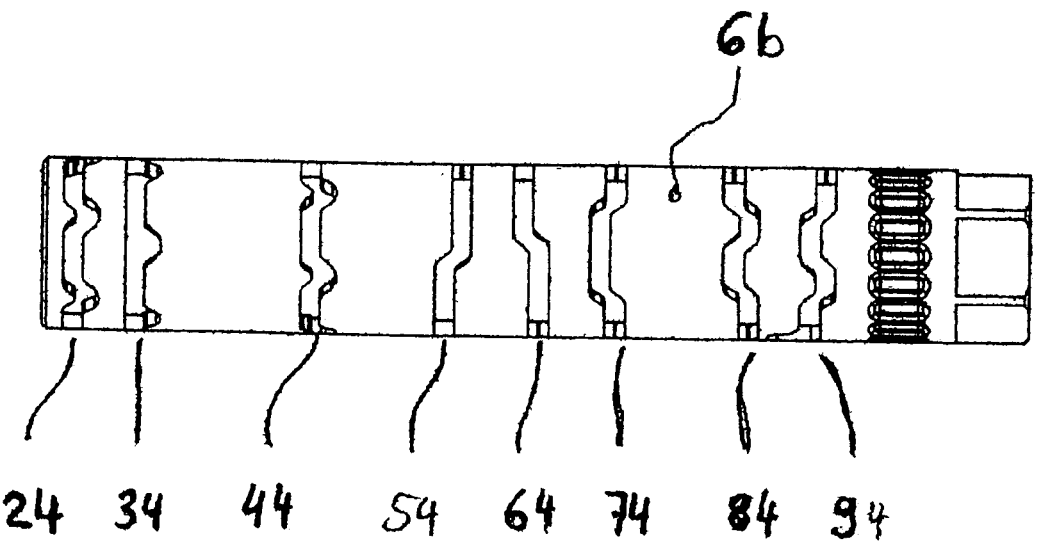
FIG. 8 illustrates a side view of the shift drum.

The preferred rear wheel hub, FIG. 1a,b and FIG. 2a,b, consists of a hub sleeve 1 supported by roller bearing 3a on the drive 4a and by roller bearing 3b on axle 6a. A drive pinion 2 for belt or chain drive is located on the drive 4a, rotationally fixed but detachably connected to it. The roller bearing S supports the drive 4a on the axle 6a. Inside the axle 6a there is a switching drum 6b (see also FIGS. 7 and 8). The oblong holes 101, 102, 103 and 104 are arranged parallel to the rotation axis and allow the cylindrical pins acting as actuators to pass through into the circumferential grooves 24, 34, 44, 54, 64, 74, 84 and 94 of the switching drum 6b. The grooves are designed in such a way that the intended movements of the shifting pins for shifting the individual gears are executed. The compression springs 22, 32, 42, 52, 62, 72, 82 and 92 are arranged in such a way that the clutches are always opened against the force of these springs. In an advantageous variant, a complete control structure is arranged on 180 degrees of the circumference of the shift drum and the hollow axle. This results in the great advantage that an exact copy of the same can be arranged on the second half of the circumference and thus the clutch plates can be controlled in parallel by means of second cylindrical pins. This prevents any shift inhibition due to a tilting load, which inevitably occurs with one-sided actuation.

The second NSG gear unit, FIG. 2a, consists of a drive sleeve 4b with internal and external toothing and at least one, but preferably two or three oblong holes 4c offset by 180 degrees or 120 degrees, an output sleeve 4d also with internal and external toothing and at least one, but preferably two or three oblong holes 4e offset by 180 degrees or 120 degrees. The drive sleeve is connected to the side wall 7b via the external gearing, and the abrasion sleeve is connected to the hub sleeve 1. The gear stage itself consists of the ring gear 200, the side walls 201a and 201b, at least one of which is designed to be connected to the ring gear 200 via a detachable connection, and also of the web 202 and the planets 203a and 203b which are connected to each other in a rotationally fixed manner, and the sun gear 204. The planet 203a meshes with the ring gear 200 and the planet 203b with the sun gear 204, the side wall 201a is connected with the coupling part 51b and the side wall 201b with the coupling part 91b in a rotationally fixed manner. The coupling parts 61b and 81b are connected to the web 202 in a rotationally fixed but detachable manner. If the couplings are not engaged, the crosspiece and the ring gear can rotate freely.

The coupling components are numbered in the sequence in which they follow each other on axis 6a from the drive side in steps of ten, each starting with 20 to 90; FIG. 1a-2b and FIGS. 4-6.

Clutch 20 switches the block rotation of the first gear unit G1 by connecting or disconnecting the sun gear 9c to the drive 4a and thus to the web 8.

Clutch 20 shifts the gears G1, G4, and G7. The travel stop 21a engages the counterpart 21b, which is firmly connected to the sun gear, and prevents the sun gear from overrunning the web 8. The other components are a return spring 22, which is supported in the actuator 4a, a slider 23a with a cylindrical pin 23b, which is controlled by the groove 24.

The clutch 30 shifts the second gear of the first transmission by shifting the sun wheel 9c is set fixed to the axis. The clutch 30 shifts the gears G2, G5, and G7 of the overall transmission.

Clutch 40 shifts the third gear of the first transmission by setting the sun gear 9d to fixed position. Clutch 40 shifts gears G3, G6, and G9 of the overall transmission.

Figure 9:
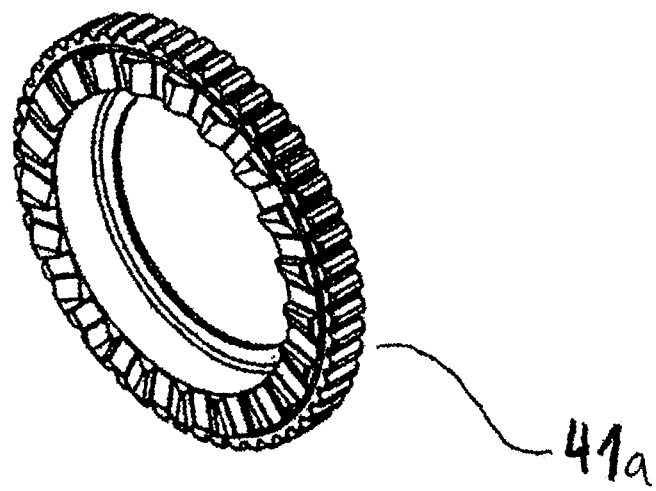
FIG. 9 illustrates a perspective view of coupling half.
Figure 10:
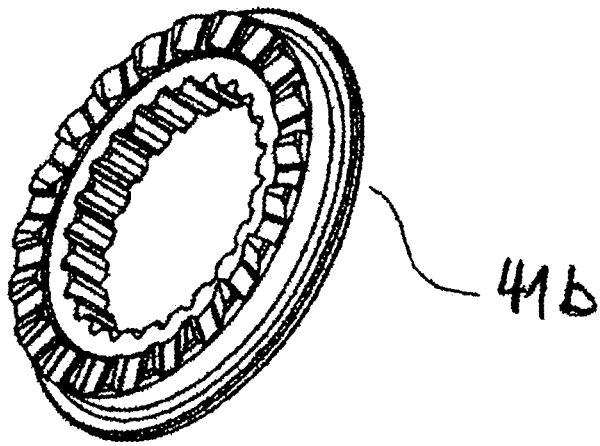
FIG. 10 illustrates a perspective view of the coupling half.

The sun gear 9d is designed as a ring with internal gearing in which the clutch part 41a (FIG. 9) designed as an anti-running clutch is guided in a rotationally fixed but axially displaceable manner. The counterpart 41b (FIG. 10) has internal teeth that connect it to the shaft 6a in a rotationally secure manner. The retaining rings 45a and 45b prevent axial movement. A slider 43a with cylindrical pin 43b is controlled by the groove 44. The spring 42 is supported by a circlip 42a inserted in the axle 6a.

Figure 11:
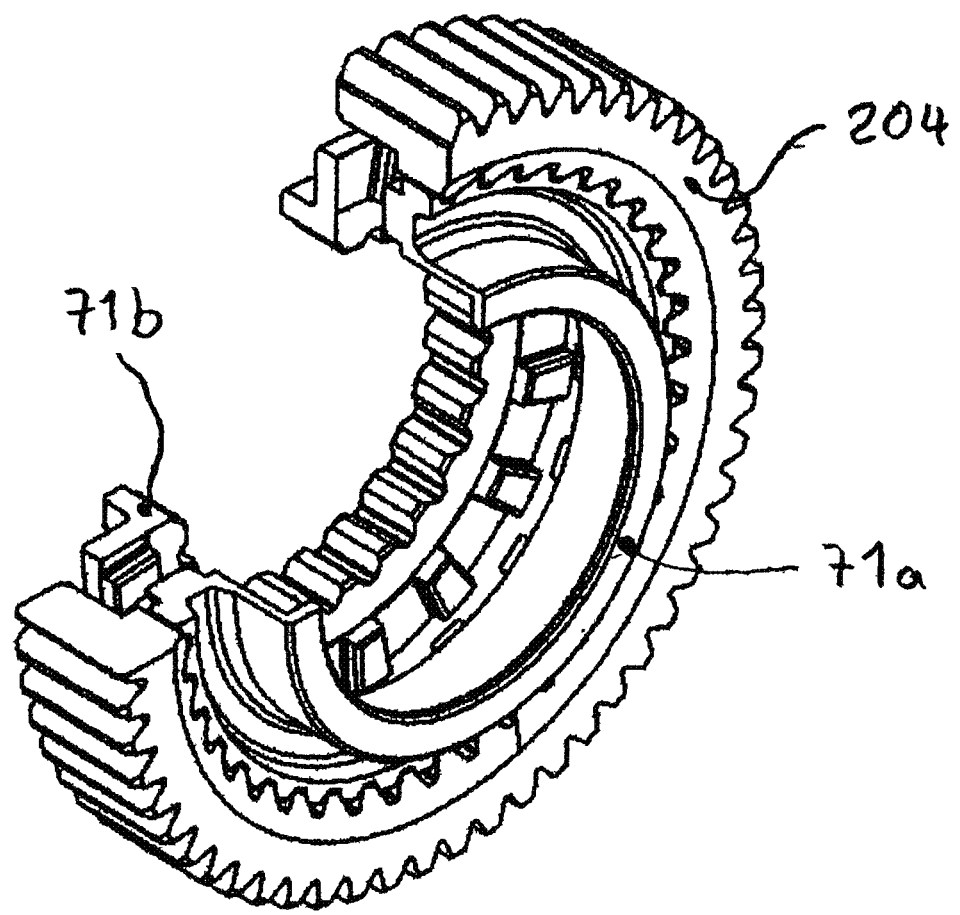
FIG. 11 illustrates a perspective view of the clutch with the sun wheel.

The clutches 50, 70, 80 shift the first gear of the second gear G2 by connecting clutch parts 51a (with cylindrical pin 51c) and 51b non-rotatably connecting the ring gear with the driver 4b, clutch parts 81b and 81a (with cylindrical pin 81c) non-rotatably connecting the web with the output sleeve 4d, and clutch parts or rings 71a (see also FIG. 11) and 71b setting the sun gear 204 axially fixed. The clutch rings 71a have a radial profiling which effects the power transmission. As shown in FIG. 11, the radial profiling of the clutch rings, which are activated in only one direction of rotation, are asymmetrically profiled such that the pressure-loaded flanks, i.e., clutch part 71a, are steeper than the flanks on the rear side thereof, i.e., clutch part 71b.

If this configuration is shifted, the gears G1, G2 and G3 are obtained together with the first gear.

The sun, planetary, and ring gears, which gears are activated in only one direction of rotation, and have an asymmetrical profiling of the wheel teeth such that the flanks loaded by tensile force have a larger tooth engagement angle than the flanks at the rear thereof.

The other components of the clutch 50 are a return spring 52 supported on the side wall 7b, a groove ring 53 with inner collar, a slider 55a with a cylindrical pin 55h controlled by the groove 54.

The clutch 70 is designed as a bidirectional clutch, since the direction of the torque is reversed when the input is switched from the ring gear to the bar. The other components of the clutch 70 are, a return spring 72, which is supported on the outer collar of the slider 63a, a slider 73a with a cylindrical pin 73b, which is controlled by the groove 74.

The other components of the clutch 80 are a return spring 82, which is supported on the outer collar of the slider 94a, and a slider 83a with a cylindrical pin 83b, which is guided in the groove 84.

The couplings 50 and 90, FIG. 2a, connect the input (drive) sleeve 4b with the output sleeve 4d via the ring gear 200, thus bridging the gear unit. The same result is obtained by engaging clutches 60 and 80, with the web transmitting the torque. In both cases, the sun can remain fixed to the axle, but this is only used for shifting purposes for a short time due to the loss of power.

The following options are available for block rotation, whereby the sun wheel can always rotate freely by opening clutch 70.

Variant 1: Clutches 50, 60, 90 closed, clutch 70 open.
Variant 2: Clutches 50, 80, 90 closed, clutch 70 open.
Variant 3: Clutches 50, 60, 80, 90 closed, clutch 70 open.
Variant 4: Couplings 60, 80, 90 closed, coupling 70 open.
Variant 5: Couplings 50, 60, 90 closed, coupling 70 open.
Variant 4: Couplings 50, 60, 80 closed, coupling 70 open.

Some of the possibilities are used as examples in the suggested switching sequence. In this configuration the second gear of the second transmission is realized. Gears G4, G5 and G6 can then be shifted.

Clutches 60, 70, and 90 shift the third gear of the second transmission by connecting clutch parts 61a and 61b to the web 202 with the driver 4b in a rotationally fixed manner, clutch parts 91b and 91a (with cylindrical pin 91c) to connect the ring gear 200 with the output sleeve 4d in a rotationally fixed manner, and clutch parts 71a and 71b to set the sun gear 204 in an axially fixed manner.

In this configuration, the third gear of the second gear is realized. Gears G7, G8, and G9 can then be shifted.

The solution of the task underlying the invention allows the use of needle bearings for the bearing of all planets. Due to the high load capacity of the manual transmission, ratios of up to i=1 can be used between bottom bracket chainring and hub drive pinion. The exclusive use of axial clutches allows particularly good opening even under load. In most shifting operations, the clutches change to freewheel mode before they are opened, so that they can be opened without load. The number of different production parts is noticeably smaller than with the state of the art. The same applies to the total mass of the manual transmission. Due to the transmission structure, only a few years are m mesh at any one time, which ensures high efficiency in the individual gears.

The invention claimed is:

1. A multi-speed transmission mounted on a central axis with a hollow shaft on an input side and a hub sleeve on an output side and with a first coaxially interposed planetary gearbox and a second coaxially interposed planetary gearbox arranged coaxially between the input side and the output side, wherein said first coaxially gearbox has corresponding sun gear wheels, corresponding planetary gear wheels, and a corresponding ring gear wheel connected to one another via associated webs, wherein the first planetary gearbox is driven at the respective web and is configured to be switched into a block rotation and a plurality of transmission modes by three clutches that can optionally be shifted into the block rotation or into said plurality of transmission modes by axle fixing of the corresponding sun gear wheels of the first planetary gearbox, wherein said second coaxially gearbox has a corresponding sun gear wheel, corresponding planetary gear wheels, and a corresponding ring gear wheel connected to one another via associated webs, wherein the second planetary gearbox is configured to be shifted into said plurality of transmission modes by further couplings by axle fixing of the corresponding sun gear of the second planetary gearbox with mutual shifting of the input side and the output side via the corresponding ring gear of the second planetary gearbox, wherein the sun gear of each of the first and second planetary gearboxes is configured to be shifted into a slow and a fast transmission mode as well as into a direct gear when the input side and output side are switched alternately between the corresponding ring gear and the corresponding associated webs, wherein the multi-speed transmission further comprises axially displaceable control sliders and clutch rings extending radially and spring loaded in a coupling manner to be disengaged according to a respective gear step, wherein the control sliders, guided in helical circular grooves in a coaxial shift drum and in radial slots of a hollow axis surrounding the control slides and oriented parallel to the axis of rotation of the transmission, each actuate associated clutch rings in a shifting manner.

2. The multi-speed transmission according to claim 1, wherein the grooves are configured such that a nine-speed transmission having a direct gear and eight other gears, with 40 degrees angular rotation per gear in total within only one revolution of the shift drum, can be set, whereby at least one intermediate shift combination is passed through.

3. The multi-speed transmission according to claim 2, wherein in a first four of the eight other gears only one set of planetary gear wheels is activated and in a second four of the eight other gears both sets of planetary gear wheels are activated and in the direct gear operates in a block rotation without relative rolling motion of the gears.

4. The multi-speed transmission according to claim 1, wherein the first coaxially interposed planetary gearbox provides speed conversions to i_1=1, i_2 approximately 0.81 and i_3 approximately 0.65 and the second coaxially interposed planetary gearbox provides speed conversions to i_4 approximately 1.91, i_5=1 and i_6 approximately 0.52 such that there are largely constant gear steps of approx. 24% with a transmission ratio range of approximately 560%.

5. The multi-speed transmission according to claim 1, wherein the control sliders are each guided by a cylindrical pin engaging in the associated groove and the radial slot oriented parallel to the axis of rotation of the transmission.

6. The multi-speed transmission according to claim 1, wherein the first planetary gearbox is a three- or four-stage planetary gearbox, which is driven at a corresponding web and is switched in each case by a clutch by fixing an associated sun wheel into one of the said transmission modes, whereby a twelve- or fifteen-speed gearbox is formed in total.

7. The multi-speed transmission according to claim 1, wherein the clutch rings have a radial profiling which effects the power transmission.

8. The multi-speed transmission according to claim 7, wherein the radial profiling of the clutch rings, which are activated in only one direction of rotation, are asymmetrically profiled such that pressure-loaded flanks of the clutch rings are steeper than flanks of the clutch rings on a rear side thereof.

9. The multi-speed transmission according to claim 1, wherein the sun, planetary, and ring gears are activated in only one direction of rotation, and each have wheel teeth that have an asymmetrical profiling such that flanks of the sun, planetary, and ring gears loaded by tensile force have a larger tooth engagement angle than flanks of the sun, planetary, and ring gears at a rear thereof.

10. The multi-speed transmission according to claim 1, wherein the driver is equipped with a toothed belt or chain pinion which has a number of teeth which corresponds approximately to that of a correlated crank output blade.

11. The multi-speed transmission according to claim 10, wherein the toothed belt pinion has 34 teeth and the crank output blade has 42 teeth.

12. The multi-speed transmission according to claim 1, wherein the sun gear of the second gearbox is fixed in both directions of rotation by only one clutch.

13. The multi-speed transmission according to claim 1, wherein the clutch rings to be coupled in both directions of rotation have a symmetrical profile and are thus configured to set the sun gear of the second gearbox fixed in both directions of rotation.

14. The multi-speed transmission according to claim 1, wherein the structures of the helical grooves in the shift drum as well as the slots in the hollow axis, which serve for shifting all gears, are arranged on a maximum of 180 degrees of their circumferences and copies thereof are arranged on their other circumferential halves, in each of which a further cylindrical pin engages, which in each case actuates the associated clutch ring in parallel on the other side.

* * * * *